US011486014B2

(12) United States Patent
Goto et al.

(10) Patent No.: US 11,486,014 B2
(45) Date of Patent: Nov. 1, 2022

(54) METHOD FOR PRODUCING PLATED BLACK HEART MALLEABLE CAST IRON MEMBER, PLATED BLACK HEART MALLEABLE CAST IRON MEMBER, AND PIPE JOINT

(71) Applicant: Hitachi Metals, Ltd., Tokyo (JP)

(72) Inventors: Ryo Goto, Tokyo (JP); Takayuki Fukaya, Tokyo (JP); Hiroshi Matsui, Tokyo (JP); Akinori Sawada, Tokyo (JP)

(73) Assignee: Hitachi Metals, Ltd., Tokyo (JP)

( * ) Notice: Subject to any disclaimer, the term of this patent is extended or adjusted under 35 U.S.C. 154(b) by 0 days.

(21) Appl. No.: 16/648,767

(22) PCT Filed: Sep. 26, 2018

(86) PCT No.: PCT/JP2018/035656
§ 371 (c)(1),
(2) Date: Mar. 19, 2020

(87) PCT Pub. No.: WO2019/065721
PCT Pub. Date: Apr. 4, 2019

(65) Prior Publication Data
US 2020/0248279 A1  Aug. 6, 2020

(30) Foreign Application Priority Data

Sep. 26, 2017  (JP) .............................. JP2017-184901
Mar. 23, 2018  (JP) .............................. JP2018-055993

(51) Int. Cl.
*C23C 2/02* (2006.01)
*C21D 5/14* (2006.01)
*B32B 15/01* (2006.01)
*F16L 58/08* (2006.01)

(52) U.S. Cl.
CPC .............. *C21D 5/14* (2013.01); *B32B 15/013* (2013.01); *C23C 2/02* (2013.01); *F16L 58/08* (2013.01)

(58) Field of Classification Search
None
See application file for complete search history.

(56) References Cited

U.S. PATENT DOCUMENTS

| 1,781,119 A | * | 11/1930 | Marshall | .................. | C21D 1/46 |
| | | | | | 148/615 |
| 3,030,242 A | * | 4/1962 | Gieselman | ................ | C23C 2/06 |
| | | | | | 148/23 |
| 2014/0363697 A1 | | 12/2014 | Kim et al. | | |
| 2015/0079527 A1 | | 3/2015 | Takahashi et al. | | |

FOREIGN PATENT DOCUMENTS

| CN | 85106684 A | * | 3/1987 |
| CN | 104024464 A | | 9/2014 |
| CN | 105714229 A | | 6/2016 |
| JP | S58-151463 A | | 9/1983 |
| JP | 2012-241277 A | | 12/2012 |
| JP | 2013/146520 A1 | | 10/2013 |
| JP | 2014-019878 A | | 2/2014 |

OTHER PUBLICATIONS

Machine Translation of JPS6058304-B2.*
Chase, "NIST-JANAF, Thermochemical Tables 2 Volume Set (Journal of Physical and Chemical Reference Data Monographs)," 4th Ed, American Institute of Physics, Aug. 1, 1998.
International Search Report issued in corresponding International Patent Application No. PCT/JP2018/035656 dated Nov. 27, 2018.
International Preliminary Report on Patentability and Written Opinion issued in corresponding International Patent Application No. PCT/JP2018/035656 dated Apr. 9, 2020.
Office Action issued in corresponding Chinese Patent Application No. 201880056185.4 dated May 8, 2021.
Li Ling, "Study on the thermally immersed aluminum coating process and coating thickness control model on steel surface," Wuhan University of Technology Chinese Doctoral Dissertations & Master's Theses Full-Text Database, 5 (2005) (see CN OA).
Changsheng et al., "The Abstract of the Advance in the Process of Hot Pipping Aluminum for Malleable Iron Castings," Journal of Kunming Institute of Technology, 14 (5) (1989) (see CN OA).
Office Action issued in corresponding Japanese Patent Application No. 2019-545559 dated May 24, 2022.

* cited by examiner

*Primary Examiner* — David P Turocy
(74) *Attorney, Agent, or Firm* — Morgan, Lewis & Bockius LLP (57) ABSTRACT

Provided is a method capable of producing a plated black heart malleable cast iron member having a plating layer with excellent adhesiveness to a black heart malleable cast iron member, while having less burden on the environment, compared to conventional methods.

16 Claims, 5 Drawing Sheets

METHOD FOR PRODUCING PLATED BLACK HEART MALLEABLE CAST IRON MEMBER, PLATED BLACK HEART MALLEABLE CAST IRON MEMBER, AND PIPE JOINT

TECHNICAL FIELD

The present invention relates to a method for producing a plated black heart malleable cast iron member, and a plated black heart malleable cast iron member and a pipe joint which are produced by the production method mentioned above.

BACKGROUND ART

Cast irons can be classified into flake graphite cast iron, spheroidal graphite cast iron, malleable cast iron, and the like according to the existence form of carbon. The malleable cast irons can be further classified into white heart malleable cast iron, black heart malleable cast iron, pearlite malleable cast iron, and the like. Black heart malleable cast iron, which is a subject matter of the present invention, is also simply called malleable cast iron and has the form in which graphite is present while being dispersed in a matrix made of ferrite. In a production process of the black heart malleable cast iron, carbon in a cast metal obtained after casting and cooling is present in the form of cementite, which is a compound of carbon with iron. Thereafter, the cast metal is heated to and held at a temperature of 720° C. or higher, so that the cementite is decomposed to precipitate graphite. Herein, the step of precipitating graphite by heat treatment is hereinafter referred to as "graphitization".

The black heart malleable cast iron is superior in mechanical strength compared to the flake graphite cast iron and also excellent in toughness because its matrix is consisted of ferrite. For this reason, the black heart malleable cast iron is widely used as material for producing automobile parts, pipe joints and the like, which require mechanical strength. The surface of a pipe joint made of the black heart malleable cast iron is often subjected to hot-dip galvanizing to prevent corrosion. The hot-dip galvanized layer has excellent durability and can be formed by plating at a relatively low cost. Thus, the hot-dip galvanized layer is suitable as corrosion prevention means for the pipe joint.

In the prior art, oxides of iron, silicon or the like are more likely to be formed on the surface of a member made of black heart malleable cast iron (hereinafter referred to as "black heart malleable cast iron member") during graphitization. If a plating layer is formed on the surface with such an oxide thereon, a plating film may not be formed locally and the surface of a base material of the member may be exposed partially (hereinafter sometimes referred to as "bare spots"). Therefore, to form a plating layer with satisfactory adhesiveness to a black heart malleable cast iron member, it is necessary to prepare a black heart malleable cast iron member having a surface on which the formation of oxides is suppressed as much as possible, and to form a plating layer on the surface.

For the purpose of producing a black heart malleable cast iron member with fewer oxides on its surface, various methods of removing oxides from the surface of the black heart malleable cast iron member have been studied. For example, Patent Document 1 describes a method for removing oxides formed on the surface of a black heart malleable cast iron member by shot blasting. Further, for example, Patent Document 2 describes a method for removing oxides by immersing a black heart malleable cast iron member in an acidic solution. The latter method is sometimes called "pickling".

PRIOR ART DOCUMENT

Patent Document

Patent Document 1: JP 58-151463 A
Patent Document 2: JP 2014-19878 A
Patent Document 3: WO 2013/146520

Non-Patent Document

Non-Patent Document 1: written by M. W. Chase., "NIST-JANAF, Thermochemical Tables", (U.S.A.), 4th edition, American Institute of Physics, Aug. 1, 1998

DISCLOSURE OF THE INVENTION

Problems to be Solved by the Invention

Both of the methods mentioned in Patent Documents 1 and 2 have problems that an increase in production cost cannot be avoided due to an addition of the step mentioned above. The pickling mentioned in Patent Document 2 has problems, such as the necessity of attention when handling an acidic solution because the acidic solution itself and a gas generated by the reaction between the black heart malleable cast iron and the acidic solution are poisonous to the human body, and a large burden on the environment when discarding the used acidic solution or exhausting the generated gas outdoors.

The present invention has been made in view of the foregoing problems. It is therefore an object of the present invention to produce a black heart malleable cast iron member having a hot-dip plating layer on its surface without performing shot blasting or pickling.

Means for Solving the Problems

The present invention in a first aspect provides a method for producing a plated black heart malleable cast iron member having a plating layer on a surface of a black heart malleable cast iron member, the method including the steps of:

performing graphitization in a non-oxidizing and decarburizing atmosphere;

immersing a black heart malleable cast iron member obtained after the graphitization, in a flux for 3.0 minutes or more;

heating the black heart malleable cast iron member taken out of the flux, to 90° C. or higher; and performing hot-dip plating on the heated black heart malleable cast iron member. According to the present invention, the formation of oxides on the surface of the black heart malleable cast iron member can be suppressed by performing the graphitization of the black heart malleable cast iron in the controlled atmosphere, thus making it possible to remove the oxides only by the immersion in the flux.

In a second aspect, the present invention provides the method for producing a plated black heart malleable cast iron member according to the first aspect, wherein the non-oxidizing and decarburizing atmosphere is an atmosphere in which a partial pressure of oxygen is 10 times or less as high as an equilibrium partial pressure of oxygen in chemical formula 1 below and higher than an equilibrium partial pressure of oxygen in chemical formula 2 below.

[Chemical Formula 1]

$$2Fe(S)+O_2(g)=2FeO(s) \tag{1}$$

[Chemical Formula 2]

$$2C(s)+O_2(g)=2CO(g) \tag{2}$$

In a third aspect, the present invention provides the method for producing a plated black heart malleable cast iron member according to the first or second aspect, further including the step of preheating the black heart malleable cast iron member at a temperature of 275° C. or higher and 425° C. or lower before the step of performing the graphitization.

In a fourth aspect, the present invention provides the method for producing a plated black heart malleable cast iron member according to any one of the first to third aspects, wherein the step of performing the graphitization includes first graphitization that includes heating the black heart malleable cast iron member at a temperature exceeding 900° C. and second graphitization that is performed on the black heart malleable cast iron member at a start temperature of 720° C. or higher and 800° C. or lower and at a completion temperature of 680° C. or higher and 780° C. or lower.

In a fifth aspect, the present invention provides the method for producing a plated black heart malleable cast iron member according to the fourth aspect, wherein at least the first graphitization in the step of performing the graphitization is performed in the non-oxidizing and decarburizing atmosphere.

In a sixth aspect, the present invention provides the method for producing a plated black heart malleable cast iron member according to any one of the first to fifth aspects, wherein the non-oxidizing and decarburizing atmosphere contains a converted gas generated by combustion of a mixed gas of combustion gas and air. By performing the graphitization using the converted gas in the decarburizing atmosphere, the production cost required for the graphitization can be reduced, compared to the case where other non-oxidizing atmospheres are used.

In a seventh aspect, the present invention provides the method for producing a plated black heart malleable cast iron member according to any one of the first to sixth aspects, wherein the black heart malleable cast iron member is heated to 100° C. or higher and 250° C. or lower in the step of heating the black heart malleable cast iron member after being taken out of the flux.

In an eighth aspect, the present invention provides the method for producing a plated black heart malleable cast iron member according to any one of the first to seventh aspects, wherein the flux is an aqueous solution containing a weakly acidic chloride.

In a ninth aspect, the present invention provides the method for producing a plated black heart malleable cast iron member according to any one of the first to eighth aspects, wherein the flux is an aqueous solution containing zinc chloride and ammonium chloride.

In a tenth aspect, the present invention provides the method for producing a plated black heart malleable cast iron member according to any one of the first to ninth aspects, wherein the step of performing the hot-dip plating includes performing hot-dip galvanizing.

In an eleventh aspect, the present invention provides the method for producing a plated black heart malleable cast iron member according to any one of the first to tenth aspects, wherein the black heart malleable cast iron member is a pipe joint.

In a twelfth aspect, the present invention provides a plated black heart malleable cast iron member produced by the method for producing a plated black heart malleable cast iron member according to any one of the first to eleventh aspects, the plated black heart malleable cast iron member having a plating layer formed on a surface of the black heart malleable cast iron member, wherein the plating layer is a hot-dip galvanized layer.

In a thirteenth aspect, the present invention provides the plated black heart malleable cast iron member according to the twelfth aspect, wherein the hot-dip galvanized layer contains a silicon oxide.

In a fourteenth aspect, the present invention provides the plated black heart malleable cast iron member according to the twelfth or thirteenth aspect, wherein the black heart malleable cast iron member has no work-affected layer on a cast iron surface thereof.

In a fifteenth aspect, the present invention provides the plated black heart malleable cast iron member according to any one of the twelfth to fourteenth aspects, wherein the black heart malleable cast iron member is a pipe joint.

Effects of the Invention

The method for producing a plated black heart malleable cast iron member according to the present invention can omit the shot blasting and pickling steps which are conventionally essential to the formation of a plating layer. This can reduce a burden on the environment as well as the production cost of the black heart malleable cast iron member having the plating layer, compared to the conventional methods.

BEST MODE FOR CARRYING OUT THE INVENTION

Embodiments for carrying out the present invention will be described in detail with reference to the accompanying drawings and tables. It should be noted that the embodiments mentioned herein are merely examples, and the embodiments for carrying out the present invention are not limited to the embodiments mentioned herein.

In the specification attached to the application of Japanese Patent Application No. 2017-184901, which is a prior patent application, the applicant discloses an invention regarding a method for producing a black heart malleable cast iron member which is characterized by performing graphitization in a non-oxidizing and decarburizing atmosphere. According to this invention, the black heart malleable cast iron member with fewer oxides on its surface than in the prior art can be produced by performing the graphitization in the specific atmosphere. Furthermore, the atmosphere during the graphitization, the conditions for immersion in a flux after the graphitization and the like are considered in the present invention. The details of the consideration will be described below. It is noted that the black heart malleable cast iron member with the plating layer formed thereon is hereinafter referred to as "plated black heart malleable cast iron member". In addition, a cast iron portion of the plated black heart malleable cast iron member which is in contact with the plating layer may be referred to as "cast iron surface".

<Alloy Composition>

The main material constituting the black heart malleable cast iron member in the present invention is a black heart malleable cast iron. The contents of elements in the black heart malleable cast iron are preferably set to be as follows: 2.0% by mass or more and 3.4% by mass or less of carbon; and 0.5% by mass or more and 2.0% by mass or less of silicon, with the balance being iron and inevitable impurities. When the carbon content is 2.0% by mass or more, a casting operation becomes easier because of good fluidity of a molten metal, thus making it possible to reduce a failure rate due to the flow of the molten metal. When the carbon content is 3.4% by mass or less, the precipitation of graphite can be prevented during a casting process and a cooling process thereafter. When the silicon content is 0.5% by mass or more, the effect of promoting graphitization by the presence of silicon can be obtained, thus enabling the graphitization to be completed in a short time. When the silicon content is 2.0% by mass or less, the precipitation of graphite can be prevented during the casting process and the cooling process thereafter.

Further, the black heart malleable cast iron in the present invention more preferably contains 0.005% by mass or more and 0.020% by mass or less in total of one or two elements selected from the group consisting of bismuth and aluminum. When the total content of bismuth and aluminum is 0.005% by mass or more, the precipitation of graphite can be prevented during the casting process and the cooling process thereafter. When the total content of bismuth and aluminum is 0.020% by mass or less, the graphitization is not significantly inhibited. In addition to these elements, the black heart malleable cast iron in the present invention may contain 0.5% by mass or less of manganese.

<Preheating>

In a preferred embodiment of the present invention, the black heart malleable cast iron member before the graphitization is preheated at a temperature of 275° C. or higher and 425° C. or lower. The term "preheating" as used in the present invention refers to a heat treatment in a low-temperature range that is performed on the black heart malleable cast iron member after casting and before the graphitization. By performing the preheating, graphite obtained after the graphitization can be present while being dispersed at positions of crystal grain boundaries of ferrite, which makes the crystal grain size of the ferrite finer than that of a conventional black heart malleable cast iron. In addition, the time required for graphitization can also be shortened. The effect of such preheating is demonstrated more remarkably when the black heart malleable cast iron member contains one or two elements selected from the group consisting of bismuth and aluminum.

<Temperature and Holding Time of Graphitization>

In the method for producing a plated black heart malleable cast iron member according to the present invention, heat treatment called "graphitization" is performed, which involves heating and holding the black heart malleable cast iron member obtained after casting, at a temperature of 720° C. or higher. The graphitization is a step inherent in a production method of a black heart malleable cast iron. In the graphitization process, cementite is decomposed by heating the black heart malleable cast iron member to a temperature exceeding 720° C. corresponding to the A1 transformation point to precipitate graphite, and a matrix made of austenite is cooled to be transformed into ferrite, which can impart the toughness to the black heart malleable cast iron member. The graphitization is classified into first graphitization, which is performed first, and second graphitization, which is performed after the first graphitization.

The first graphitization is a process of decomposing cementite in austenite in a range of temperatures exceeding 900° C. to precipitate graphite. In the first graphitization, carbon separated by decomposing cementite contributes to the formation of graphite. The temperature at which the first graphitization is performed is preferably 920° C. or higher and 980° C. or lower. The holding time required for the first graphitization varies depending on the size of the black heart malleable cast iron member to be graphitized. When the above-mentioned preheating is performed, the holding time of the first graphitization is preferably set at 30 minutes or more and 3 hours or less, and more preferably 2 hours or less.

The second graphitization is a process of decomposing cementite in ferrite and/or perlite in a range of temperatures lower than the temperature at which the first graphitization is performed to precipitate graphite. The second graphitization is preferably performed while gradually decreasing the graphitization temperature from a second graphitization start temperature to a second graphitization completion temperature. Thus, the graphite can be precipitated by gradually reducing the solid solubility of carbon in austenite, ensuring that the transformation from austenite to ferrite proceeds.

The second graphitization start temperature is preferably 720° C. or higher and 800° C. or lower. The second graphitization completion temperature is 680° C. or higher and 780° C. or lower, and preferably 720° C. or lower. The second graphitization completion temperature is preferably lower than the second graphitization start temperature. The time required from the start of the second graphitization to the completion thereof also varies depending on the size of the black heart malleable cast iron member to be graphitized. When the above-mentioned preheating is performed, the time of the second graphitization is preferably set at 30 minutes or more and 3 hours or less, and more preferably 2 hours or less. When shifting from the first graphitization to the second graphitization, the graphitization temperature is lowered from the temperature of the first graphitization to the start temperature of the second graphitization. It is noted that the production method of the present invention does not include lowering the graphitization temperature from the temperature of the first graphitization to a temperature lower than the second graphitization start temperature, for example, the room temperature or the like, and then raising this temperature up to the second graphitization start temperature. The time required to lower the graphitization temperature while shifting from the first graphitization to the second graphitization is not particularly limited.

<Non-Oxidizing Atmosphere>

In the method for producing a plated black heart malleable cast iron member according to the present invention, the graphitization of the black heart malleable cast iron member is performed in the non-oxidizing and decarburizing atmosphere. The term "non-oxidizing atmosphere" as used in the present invention means not only a reducing atmosphere in a strict sense, i.e., an atmosphere that has a partial pressure of oxygen lower than the equilibrium partial pressure of oxygen in chemical formula 1 at the graphitization temperature to be described later, but also an atmosphere in which an iron oxide is not formed to the extent that it interrupts with the formation of a plating layer, through the reaction of iron contained in the black heart malleable cast iron member with gas constituting the atmosphere. That is, the term "non-oxidizing atmosphere" as used in the present invention is based on the wider concept that also includes an atmosphere which does not form an oxide layer with a thickness enough to interfere with the formation of the plating layer. Specifically, the term "non-oxidizing atmosphere" as used herein means that the partial pressure of oxygen in the atmosphere for the graphitization is 10 times or less as high as the equilibrium partial pressure of oxygen in chemical formula 1 to be described in detail below. Thus, when the equilibrium partial pressure of oxygen in chemical formula 1 at the graphitization temperature is determined, the non-oxidizing atmosphere in the present invention includes a situation in which the partial pressure of oxygen in the graphitization atmosphere is lower than approximately 10 times the equilibrium partial pressure of oxygen in chemical formula 1, and even a situation in which the partial pressure of oxygen in the graphitization atmosphere is equal to or lower than the determined equilibrium partial pressure of oxygen to perform the graphitization. The partial pressure of oxygen in the graphitization atmosphere is preferably six times or less, more preferably three times or less, and still more preferably equal to or less than the above-mentioned equilibrium partial pressure of the oxygen in chemical formula 1.

A chemical formula representing the typical reaction among iron oxidation reactions is represented by chemical formula 1.

[Chemical Formula 3]

$$2Fe(S)+O_2(g)=2FeO(s) \qquad (1)$$

where Fe(s) represents solid iron, $O_2$(g) represents gaseous oxygen, and FeO(s) represents solid ferrous oxide (wustite). There are known several ion oxidation reactions other than that represented by chemical formula 1, but the oxidation reaction that has the lowest standard Gibbs energy at the graphitization temperature is the reaction represented by chemical formula 1. Therefore, in the atmosphere where the iron oxidation reaction represented by chemical formula 1 is less likely to proceed, any iron oxidation reactions represented by other chemical formulas are less likely to proceed either.

In the non-oxidizing atmosphere where the graphitization is performed, the equilibrium partial pressure of oxygen in chemical formula 1 at the graphitization temperature may be determined, and then the partial pressure of oxygen in the atmosphere may be 10 times or less as high as the above-mentioned equilibrium partial pressure of oxygen in the chemical formula 1 as mentioned above. In particular, the partial pressure of oxygen in the atmosphere is preferably equal to or lower than the determined equilibrium partial pressure of oxygen. With such an arrangement, the reaction represented by chemical formula 1 maintains its chemical equilibrium or proceeds from the right to the left of the chemical formula, thereby more sufficiently interrupting with the formation of an iron oxide. The value of the equilibrium partial pressure of oxygen in chemical formula 1 at the graphitization temperature can be determined by calculation using the value of the standard Gibbs energy of chemical formula 1 mentioned in the literature (Non-Patent Document 1). Table 1 shows an example of the calculation of equilibrium partial pressures of oxygen in chemical formula 1 during the first graphitization (980° C.) and second graphitization (760° C.).

TABLE 1

| Chemical formula | Equilibrium partial pressure of oxygen (atm) | |
|---|---|---|
| | First graphitization (980° C.) | Second graphitization (760° C.) |
| (1) $2Fe + O_2 = 2FeO$ | $3.4 \times 10^{-16}$ | $5.1 \times 10^{-21}$ |
| (2) $2C + O_2 = 2CO$ | $2.6 \times 10^{-19}$ | $2.8 \times 10^{-21}$ |

The partial pressure of oxygen in the graphitization atmosphere needs to be recognized in order to know whether the partial pressure of oxygen in the graphitization atmosphere is equal to or lower than the equilibrium partial pressure of oxygen in chemical formula 1 shown in Table 1 and how many times the partial pressure of oxygen in the graphitization atmosphere is as high as the equilibrium partial pressure of oxygen in chemical formula 1. As a method for measuring the partial pressure of oxygen in the atmosphere, for example, there is a method for directly measuring the partial pressure of oxygen in the atmosphere using a zirconia oxygen concentration meter, a quadrupole mass spectrometer, or the like. However, when measuring extremely low partial pressures of oxygen, such as those shown in Table 1, these direct methods may not achieve sufficient measurement accuracy.

When using converted gas as atmosphere gas for the graphitization, the ratio of the partial pressure of carbon monoxide to that of carbon dioxide in the atmosphere or the ratio of the partial pressure of hydrogen to that of water vapor in the atmosphere can be measured, thereby indirectly calculating the partial pressure of oxygen that is equilibrated with these gases, for example, as described in Patent Document 3. This calculation is performed on the assumption that chemical equilibrium is established in a reaction ($2CO+O_2=2CO_2$) in which carbon monoxide and oxygen react to generate carbon dioxide or in a reaction ($2H_2+O_2=2H_2O$) in which hydrogen and oxygen react to generate water vapor in a heat treatment furnace.

In the present invention, as a method for making the graphitization atmosphere non-oxidizing, a well-known method capable of reducing the partial pressure of oxygen can be used. Specific methods include, for example, a method for maintaining the interior of a heat treatment furnace in a high vacuum, a method for filling the interior of the heat treatment furnace with non-oxidizing gas, and the like, but are not limited thereto.

In a preferred embodiment of the present invention, the non-oxidizing atmosphere contains converted gas that is generated by combustion of a mixed gas of combustion gas and air. Since the converted gas can be generated at relatively low cost, the production cost required for the graphitization can be reduced, compared to the case where other non-oxidizing atmospheres are used. Combustion gases that can be used to generate the converted gas include propane gas, butane gas, a mixed gas of the above gases, liquefied petroleum gas, liquefied natural gas, and the like.

A gas generator can be used to generate the converted gas. Increasing the mixing ratio of the air in the combustion gas generates a complete combustion type gas with high $CO_2$ and $N_2$ contents. In contrast, decreasing the mixing ratio of the air generates an incompletely combustion type gas with high CO and $H_2$ contents. The water vapor contained in the converted gas can be partially removed by a refrigeration dehydrator.

When using the converted gas to form a non-oxidizing atmosphere, if the partial pressure of oxygen in the heat treatment furnace, which has been known by any of the above-mentioned methods, is much higher than the equilibrium partial pressure of oxygen in chemical formula 1 shown in Table 1, the partial pressure of oxygen can be lowered either by reducing the mixing ratio of the air mixed in the combustion gas to increase the ratio of the CO gas and the $H_2$ gas, or by decreasing the cooling temperature of the refrigeration dehydrator to lower the dew point of the converted gas. Alternatively, both these methods may be used.

It is noted that in the present invention, the graphitization is performed in the non-oxidizing and decarburizing atmosphere as mentioned later. That is, although the graphitization atmosphere is also the decarburizing atmosphere, it is not so important to make the graphitization atmosphere non-oxidizing, compared to making the graphitization atmosphere decarburizing. In other words, even when an oxide layer is slightly formed on the surface of the black heart malleable cast iron member during the graphitization, the oxide layer does not pose any problem as long as it does not significantly interfere with the formation of a plating layer. Therefore, the term "non-oxidizing atmosphere" as used in the present invention is based on the wider concept as mentioned above.

In a preferred embodiment of the present invention, the second graphitization is performed in the reducing atmosphere, i.e., an atmosphere where the partial pressure of oxygen is lower than the equilibrium partial pressure of oxygen in chemical formula 1 mentioned above. Even when an oxide is formed on the surface of the black heart malleable cast iron member during the first graphitization, the oxide formed once is reduced by performing the second graphitization under the reducing atmosphere, so that the thickness of the oxide can be reduced not to interfere with the formation of the plating layer.

<Decarburizing Atmosphere>

In the method for producing a plated black heart malleable cast iron member according to the present invention, the graphitization atmosphere for the black heart malleable cast iron member is also a decarburizing atmosphere. The term "decarburizing atmosphere" as used in the present invention refers to an atmosphere in which carbon contained in the black heart malleable cast iron member is oxidized by oxygen gas in the atmosphere to become carbon monoxide, and the carbon monoxide gas is detached outward from the surface of the black heart malleable cast iron member, thereby promoting the removal of carbon. This chemical reaction can be represented by chemical formula 2 below.

[Chemical Formula 4]

$$2C(s)+O_2(g)=2CO(g) \quad (2)$$

where C(s) represents solid carbon, $O_2(g)$ represents gaseous oxygen, and CO(g) represents gaseous carbon monoxide. The oxidation reactions of carbon include a reaction $(C+O_2=CO_2)$ in which carbon reacts with oxygen to generate carbon dioxide, as well as the reaction represented by chemical formula 2. However, the reaction represented by chemical formula 2 that has a lower standard Gibbs energy proceeds preferentially in a range of temperatures of 720° C. or higher at which the graphitization is performed.

To perform the graphitization under the decarburizing atmosphere, the equilibrium partial pressure of oxygen in chemical formula 2 at the graphitization temperature may be determined, and then the graphitization may be performed in a state where the partial pressure of oxygen in the graphitization atmosphere is higher than the equilibrium partial pressure of oxygen. With such an arrangement, the reaction represented by chemical formula 2 proceeds from the left to the right of the chemical formula 2, whereby carbon contained in the black heart malleable cast iron reacts with oxygen to generate carbon monoxide, which is detached outward to promote decarburizing. The value of the equilibrium partial pressure of oxygen in chemical formula 2 at the graphitization temperature can be determined by calculation using the value of the standard Gibbs energy of chemical formula 2 mentioned in the literature (Non-Patent Document 1). Table 1 shows an example of the calculation of the equilibrium partial pressures of oxygen in chemical formula 2 during the first graphitization (980° C.) and second graphitization (760° C.)

To know whether the partial pressure of oxygen in the graphitization atmosphere is higher than the equilibrium partial pressure of oxygen in chemical formula 2 shown in Table 1, it is necessary to measure the partial pressure of oxygen in the atmosphere. The method for measuring an oxygen concentration in the atmosphere has been described above, and a description thereof is omitted. When the determined partial pressure of oxygen in the atmosphere is higher than the equilibrium partial pressure of oxygen in chemical formula 2 shown in Table 1, the graphitization can be performed in the decarburizing atmosphere as it is. When the partial pressure of oxygen in the heat treatment furnace is equal to or lower than the equilibrium partial pressure of oxygen in chemical formula 2 in the case of using the converted gas in the atmosphere, the partial pressure of oxygen can be adjusted to be higher than the equilibrium partial pressure of oxygen in chemical formula 2, for example, either by a method of increasing the mixing ratio of the air in the converted gas generator or increasing the dew point of the converted gas. It is noted that the method for adjusting a partial pressure of oxygen is not limited thereto.

In the present invention, since the graphitization is performed in a decarburizing atmosphere, no graphite is formed on the surface of the black heart malleable cast iron member during the graphitization process. Thus, according to the production method of the present invention, the black heart malleable cast iron member that hardly has any graphite formed on its surface can be produced after the graphitization and before formation of the plating layer. Thereafter, the plating layer with excellent adhesiveness can be formed on the surface of the black heart malleable cast iron member.

In the present invention, the graphitization including both the first graphitization and the second graphitization may be performed in the non-oxidizing and decarburizing atmosphere, or otherwise at least the first graphitization is preferably performed in the non-oxidizing and decarburizing atmosphere. In the latter case, it is considered that the second graphitization is performed in an atmosphere which is not a decarburizing atmosphere. However, since the second graphitization is performed at a temperature lower than that in the first graphitization, the rate of precipitation of graphite on the surface of the black heart malleable cast iron member during the second graphitization is slower than that during the first graphitization. Therefore, by performing at least the first graphitization in the decarburizing atmosphere, the effects of the present invention can be obtained.

In this way, the method for producing a plated black heart malleable cast iron member according to the present invention includes the step of performing the graphitization in the non-oxidizing and decarburizing atmosphere. For example, to achieve the non-oxidizing and decarburizing atmosphere during the first graphitization (at 980° C.), the partial pressure of oxygen in the furnace is set to be higher than $2.6 \times 10^{-19}$ atm, which is the equilibrium partial pressure of oxygen in chemical formula 2 shown in Table 1, and equal to or lower than $3.4 \times 10^{-16}$ atm, which is the equilibrium partial pressure of oxygen in chemical formula 1 shown in Table 1, as an example.

As mentioned above, according to the method for producing a plated black heart malleable cast iron member of the present invention, the surface of the black heart malleable cast iron member can be adjusted to make its texture suitable for the formation of the plating layer thereon by utilizing the step of graphitization essential to the production. Consequently, this method can omit the shot blasting or pickling process which is absolutely essential to the conventional methods, prior to the formation of a plating layer.

<Ferrite Layer>

In a preferred embodiment of the present invention, the black heart malleable cast iron member after the graphitization and before the formation of the plating layer has, on its surface, a ferrite layer with a thickness exceeding 100 µm. The term ferrite layer as used herein refers to a layered microstructure made of ferrite, called α (alfa) phase in an iron-carbon binary phase diagram, that hardly contains carbon. In a preferred embodiment, as the decarburizing proceeds on the surface of the black heart malleable cast iron member, consequently austenite with less carbon content is formed and eventually becomes the ferrite layer with a thickness exceeding 100 µm when cooled after completion of the graphitization. After the formation of the ferrite layer, graphite is not present at the surface of the black heart malleable cast iron member as well as in the inside of the vicinity of the ferrite surface layer. This arrangement is preferable because it can form the more robust plating layer with excellent adhesiveness.

Although the white heart malleable cast iron is subjected to decarburizing in a decarburizing atmosphere, the black heart malleable cast iron and the pearlite malleable cast iron are not normally subjected to the graphitization in a decarburizing atmosphere. However, in the present invention, the graphitization is performed in the decarburizing atmosphere for the purpose of enabling the formation of the plating layer with excellent adhesiveness. Thus, even when the ferrite layer is formed on the surface of the black heart malleable cast iron member, the ferrite layer barely affects the mechanical properties of the black heart malleable cast iron member as long as the thickness of the ferrite layer is not so large.

In the present invention, when a ferrite layer is formed on the surface of the black heart malleable cast iron member, a thin oxide layer of iron may be formed on the surface of the ferrite layer. Even when the oxide layer is formed, the oxide layer can be removed by a subsequent step of the flux treatment if its thickness is small. The formation of the thin oxide layer is preferable because it can prevent the decarburizing of the surface of the black heart malleable cast iron member from proceeding excessively. The allowable thickness of the oxide layer which can be formed on the surface of the ferrite layer is preferably 20 µm or less, and more preferably 10 µm or less.

<Flux Treatment>

The method for producing a plated black heart malleable cast iron member according to the present invention has a step of immersing the black heart malleable cast iron member obtained after the graphitization, into a flux. As the flux used in the present invention, a well-known weakly acidic chloride aqueous solution suitable for the flux can be used. In general, the flux has functions of forming a thin film on the surface of a member to be plated to thereby improve the wettability with a molten metal and preventing rusting until the hot-dip plating is performed, and as a result, exhibits effects of making the thickness of the plating layer formed on the surface of the member to be plated uniform or improving the adhesiveness of the plating layer to the surface of the member. Thus, the step of immersing the member to be plated, into the flux in the hot-dip plating cannot be omitted. The immersion of the black heart malleable cast iron member into the flux in the present invention also exhibits a unique function of removing the thin oxide layer formed during the graphitization, in addition to the above-mentioned functions.

In the present invention, the immersion in the flux serves to demonstrate the new function of removing the oxide layer formed on the surface of the black heart malleable cast iron member during the casting and graphitizing processes, which can omit the step of removing the oxide by the pickling in the prior art. The flux made of the chloride aqueous solution can be repeatedly used, which eliminates the need to discard an acidic solution when performing pickling. The chemical reaction between the black heart malleable cast iron member and the weakly acidic chloride aqueous solution used in the flux is milder than a chemical reaction between the black heart malleable cast iron member and a strongly acidic solution used in the conventional pickling, and also generates less gas during its treatment. Therefore, the method for producing a black heart malleable cast iron member according to the present invention can significantly reduce a burden on the environment, compared to the conventional production methods.

When the flux is made of a chloride aqueous solution, the chloride concentration in the chloride aqueous solution is preferably 10% by mass or more and 50% by mass or less. When the chloride concentration is 10% by mass or more, the effect of removing the oxide layer becomes remarkable. The effect of removing the oxide layer does not change so much even when the chloride concentration increases to exceed 50% by mass. When the chloride concentration is 50% by mass or less, the chloride consumed in initial make-up of a flux bath can be saved. In addition, the formed flux film does not become too thick and thus is easily dried. A more preferred concentration of the chloride aqueous solution is 20% by mass or more and 40% by mass or less.

In a preferred embodiment of the present invention, the chloride contained in the flux is one or more of zinc chloride, ammonium chloride, and potassium chloride. The flux is preferably an aqueous solution containing zinc chloride and ammonium chloride. The ratio of the ammonium chloride content to the zinc chloride content in the flux is preferably 2 or more and 4 or less to 1 in molar ratio. Among them, the flux in which the ratio of the ammonium chloride content to the zinc chloride content is 3 to 1 in molar ratio, that is, the flux in which the ratio of the ammonium chloride content to the zinc chloride content is 54% to 46% in mass ratio is more preferable because it can be easily dried.

When the flux is an aqueous solution containing zinc chloride and aluminum chloride, the temperature of the flux is preferably 60° C. or higher and 95° C. or lower. When the temperature of the flux is 60° C. or higher, the effect of removing the oxide layer becomes remarkable. When the temperature of the flux is 95° C. or lower, boiling of the flux can be prevented, so that the black heart malleable cast iron member can be immersed in the flux more safely, and the oxide layer can also be removed more stably. When the temperature of the flux is 90° C. or higher, hydrolysis of ammonium chloride proceeds to stabilize the concentration of the flux, so that the effect of removing the oxide layer is also enhanced. Thus, the temperature of the flux is more preferably 90° C. or higher.

A preferred time for immersing the black heart malleable cast iron member in the flux depends on conditions, such as the composition, concentration, and temperature of the flux, the degree of deterioration of the flux, the size of the black heart malleable cast iron member, and the thickness of the oxide layer formed on the surface of the black heart malleable cast iron member. Typically, this immersion time is 3.0 minutes or more, and preferably 5.0 minutes or more and 60 minutes or less. The immersion time of 5.0 minutes or more is preferable because of its remarkable effect of removing the oxide layer. The effect of removing the oxide layer is not significantly affected when the immersion time exceeds 60 minutes. Therefore, the immersion time of 60 minutes or less enables prevention of excessive dissolution of the black heart malleable cast iron member, which can prolong the flux. The immersion time in the flux is more preferably 10 minutes or more and 50 minutes or less, and still more preferably 15 minutes or more and 40 minutes or less. However, when the thickness of the oxide layer formed on the surface of the black heart malleable cast iron member is very thick, the black heart malleable cast iron member may be immersed in the flux for more than 60 minutes.

Repeated immersion of the black heart malleable cast iron member in the flux causes the flux to turn green. This is presumed to be because iron is dissolved in the flux to form iron(II) chloride (ferrous chloride). Further continued use of the flux causes the flux to turn red-brown. This is presumed to be because iron(II) chloride is oxidized to form iron(III) chloride (ferric chloride). Still further continued use of the flux causes further oxidation to form and precipitate iron(III) hydroxide. Since the attachment of iron(III) hydroxide on the surface of the black heart malleable cast iron member causes bare spots, iron(III) hydroxide is preferably removed from the flux by filtration. The concentration of the flux is managed to be within a preferred range while removing the iron(III) hydroxide by filtration, thereby making it possible to continuously use the flux once in the bath for a long period of time.

The concentration of the flux can be managed by well-known means, such as analysis of the specific gravity or pH of the flux, or chemical components contained in the flux. For example, when using as the flux, a chloride aqueous solution in which the ratio of the ammonium chloride content to the zinc chloride content is 3 to 1 in molar ratio, the concentration of the chloride aqueous solution can be adjusted within a preferred range from 10% by mass or more to 50% by mass or less by adjusting the dissolution amount of solutes so that the specific gravity of the chloride aqueous solution measured at 90° C. becomes 1.05 or more and 1.30 or less. By adjusting the dissolution amount of solutes so that the specific gravity of the chloride aqueous solution measured at 90° C. becomes 1.10 or more and 1.20 or less, the concentration of the chloride aqueous solution can be adjusted within a more preferable range from 20% by mass or more to 40% by mass or less. Even when the concentration of the flux is reduced by continuously using the flux, the concentration of the flux can be managed not to deviate from the preferred range by adding the solutes so that the specific gravity of the flux falls within the above-mentioned range. The specific gravity of the flux can be measured using, for example, a floating balance. The preferred pH range of the flux used in the present invention is 3.0 or more and 6.0 or less.

<Heat Treatment>

In the preferred embodiment of the present invention, the production method further includes a step of heating the black heart malleable cast iron member after taking it out of the flux and before performing hot-dip plating thereon. The occurrence of bare spots tends to be easily suppressed by previously heating the black heart malleable cast iron member before the hot-dip plating. The heating temperature of the black heart malleable cast iron member depends on the size or shape of the black heart malleable cast iron member. The heating temperature of the black heart malleable cast iron member is 90° C. or higher. Typically, the heating temperature of the black heart malleable cast iron member is preferably 100° C. or higher and 250° C. or lower. Heating at 100° C. or higher can sufficiently dry the flux and can also promote harmlessness through a reaction between the flux and the oxide layer on the surface of the black heart malleable cast iron member. Heating at 250° C. or lower can prevent the peeling-off of the flux and the additional oxidation of the surface of the black heart malleable cast iron member without decomposing the flux due to an increase in its temperature. The more preferred heating temperature is 150° C. or higher and 200° C. or lower.

The well-known heating means, such as a heat treatment furnace, can be used for the heating. For example, the black heart malleable cast iron member taken out of the flux may be inserted in the heat treatment furnace previously heated to a predetermined temperature, and then taken out of the heat treatment furnace when its temperature reaches a preferred predetermined temperature. Subsequently, the black heart malleable cast iron member may be subjected to the hot-dip plating before the temperature of the black heart malleable cast iron member significantly decreases. In this case, the black heart malleable cast iron member does not need to be heated so that its temperature becomes uniform as a whole, and the temperature of at least a surface part on which a flux film is formed needs to reach the predetermined temperature. However, if a part of the surface on which hot-dip plating is to be performed does not reach the predetermined temperature, bare spots may be caused on the part of the surface. Therefore, the temperature of the entire surface to be subjected to the hot-dip plating preferably reaches any temperature within the above-mentioned preferred temperature range.

The time required for the heating depends on the size and shape of the black heart malleable cast iron member. For example, when the large-sized black heart malleable cast iron member is subjected to the hot-dip plating, the black heart malleable cast iron member is more preferably heated in advance over a sufficient period of time in accordance with the heat capacity of the member until the temperature of the center of the black heart malleable cast iron member reaches a temperature within the preferred temperature range. This can avoid a decrease in the temperature of the surface of the black heart malleable cast iron member during the hot-dip plating, thereby preventing the occurrence of bare spots.

<Hot-Dip Plating>

The method for producing a plated black heart malleable cast iron member according to the present invention has a step of performing hot-dip plating on the black heart malleable cast iron member taken out of the flux. The plating layer is formed on the surface of the black heart malleable cast iron member by the hot-dip plating. In the production method according to the present invention, since graphite is hardly formed on the surface of the black heart malleable cast iron member after the graphitization and before the formation of the plating layer, the plating layer with excellent adhesiveness can be formed on its surface thereafter. As the plating layer of the present invention, a plating layer made of a metal or an alloy can be used. Specifically, a metal such as zinc, tin, or aluminum, or an alloy thereof can be used, but the plating layer is not limited thereto. The hot-dip galvanizing is preferably performed.

In a preferred embodiment of the present invention, the step of performing the hot-dip plating includes a step of performing the hot-dip galvanizing. Zinc is preferable because it has a high ionization tendency and the function of sacrificial corrosion protection. When the first plating is hot-dip galvanizing, a zinc layer ($\eta$(eta) layer) is formed on the outermost surface of the plated black heart malleable cast iron member, and iron-zinc alloy layers ($\delta$(delta) 1 layer and $\zeta$(zeta) layer) are formed between the zinc layer and the surface of the black heart malleable cast iron member. These layers are firmly adhered to each other, whereby the plating layer with good adhesiveness is formed as a whole.

In the present invention, by performing graphitization in a decarburizing atmosphere, the ferrite layer can be generated on the surface of the black heart malleable cast iron member after the graphitization and before the formation of the plating layer. The same applies to the case where the ferrite layer is formed, and in this case, ferrite and zinc react with each other to form an alloy layer. After the formation of the hot-dip galvanized layer, the ferrite layer may remain inside the plating layer, or alternatively the ferrite layer may disappear.

When the step of performing hot-dip plating includes a step of performing hot-dip galvanizing, the temperature of a galvanizing bath used for hot-dip galvanizing is preferably 450° C. or higher and 550° C. or lower. When the temperature of the galvanizing bath is 450° C. or higher, the solidification of zinc in the galvanizing bath can be prevented. When the temperature of the galvanizing bath is 550° C. or lower, an excessive reaction between the galvanized layer and the surface of the black heart malleable cast iron member can be prevented. A more preferred temperature of the galvanizing bath is 480° C. or higher and 520° C. or lower.

In a preferred embodiment of the present invention, when the step of performing the hot-dip plating includes the step of performing the hot-dip galvanizing, the galvanizing bath used for the hot-dip galvanizing may contain aluminum. When aluminum is molted in the galvanizing bath, the formation of a zinc oxide film on the surface of a molten plating solution in the galvanizing bath is suppressed, thereby making the liquid surface of the plating solution clean. The formed galvanized layer also increases its gloss and improves its appearance.

The method for producing a plated black heart malleable cast iron member according to the present invention can form the plating layer by the hot-dip plating without causing bare spots even when omitting pickling. The reason for this is not necessarily clear, but is presumed to be as follows. The first reason is that there are few substances that cause bare spots on the surface of the black heart malleable cast iron member after the graphitization and before the hot-dip plating. Graphite which is one of the substances that cause bare spots is hardly formed because the graphitization is performed in the decarburizing atmosphere. An oxide layer is hardly formed or is formed extremely thinly if it is present, because the graphitization is also performed in the non-oxidizing atmosphere.

Even if the oxide layer partially remains, most of the oxide layer is removed when being immersed in the flux. When the immersion time in the flux is short, a phenomenon called "plating bath float" appears, in which hydrogen generated during the hot-dip plating is attached as air bubbles on the surface of the member to be plated, causing the member to be plated to float on the surface of the plating solution in the plating bath. The details of the reason for this is not clear, but this is presumed to be because if the immersion time in the flux is insufficient, the substance that would cause the generation of hydrogen still remains on the surface of the black heart malleable cast iron member. However, in the present invention, the plating bath float hardly occurs if the immersion time in the flux is set sufficiently long.

The second reason is that the oxide layer thinly formed on the surface of the black heart malleable cast iron member is peeled off the surface of the black heart malleable cast iron member during the hot-dip plating process, and thereby the oxide layer becomes harmless. When the flux is made of an aqueous solution containing zinc chloride and ammonium chloride, iron oxides on the surface of the black heart malleable cast iron member may chemically react with ammonium chloride to form a black product. The product is normally less likely to be peeled off and thus becomes one of the substances that cause bare spots. However, in the present invention, a phenomenon is observed in which during the hot-dip plating, the black product is peeled off the surface of the black heart malleable cast iron member to float on the surface of the plating solution in the plating bath. From this fact, it is presumed that in the present invention, in a case where the above-mentioned black product is formed, this black product is peeled off during the hot-dip plating process, so that no bare spots occur even when omitting pickling.

The above-mentioned phenomenon in which the black product is peeled off the surface of the black heart malleable cast iron member to float on the surface of the plating solution in the plating bath during the hot-dip plating tends to be remarkably observed especially when the production method further includes the step of heating the black heart malleable cast iron member taken out of the flux before performing the hot-dip plating. The detailed reason for this is not clear, but is presumed to be related to the fact that the black heart malleable cast iron member heated within the preferred temperature range is immersed in the hot-dip plating bath, and the surface temperature of the black heart malleable cast iron member immediately after the immersion is higher than that in the case of immersion without heating. That is, in the case of the immersion without heating, when the flux on the surface of the black heart malleable cast iron member is decomposed in contact with the molten metal, the temperature of the reaction between a decomposition product of the flux and the iron oxide on the surface of the black heart malleable cast iron becomes low, whereby the reaction rate therebetween becomes low. Consequently, the entire iron oxides cannot be completely changed into the black product and thus is less likely to be peeled off. In contrast, when immersing the black heart malleable cast iron member in the hot-dip plating bath after the heating, it is considered that the reaction between the decomposition product of the flux and the iron oxide is completed shortly because the reaction temperature as well as the reaction rate are high, thus changing the entire iron oxides into the black product, which is easily peeled off the surface of the black heart malleable cast iron member.

The plated black heart malleable cast iron member of the present invention contains a silicon oxide in the hot-dip galvanized layer. The plated black heart malleable cast iron member of the present invention is not subjected to shot peening in the manufacturing process and thus does not have any work-affected layer on the cast iron surface of the black heart malleable cast iron member.

<Pipe Joint and Production Method Thereof>

The present invention also relates to an invention of the method for producing a plated black heart malleable cast iron member, which is a pipe joint. The present invention further relates to an invention of a pipe joint produced by either of the above-mentioned method for producing a plated black heart malleable cast iron member. The plated black heart malleable cast iron member according to the present invention can be suitably used in the pipe joint that requires the high level of corrosion resistance, because it has excellent adhesiveness to the plating layer formed on its surface. When the plated black heart malleable cast iron according to the present invention is used as the pipe joint, an external or internal thread used for the connection of the pipe joint can be provided at an end of the pipe joint by machining after the hot-dip plating is performed.

The plated black heart malleable cast iron member and the pipe joint according to the present invention only need to be provided with the hot-dip galvanized layer, and other layers may be applied on the hot-dip galvanized layer by painting with a thermosetting resin, lining with a thermosetting resin, chemical conversion coating, sputtering of metal, thermal spraying, or the like.

EXAMPLES

REFERENCE EXAMPLES

A molten metal containing 3.1% by mass of carbon, 1.5% by mass of silicon, and 0.4% by mass of manganese, with the balance being iron and inevitable impurities, was prepared. Then, only 700 kg of the molten metal was poured into a ladle, to which 210 g (0.030% by mass) of bismuth was then added and stirred. The mixture was immediately poured into a mold to cast a plurality of pipe joints having three types of shapes. Table 2 shows the nominal diameters, wall thicknesses and masses of cast pipe joints.

TABLE 2

| Shape | Nominal diameter (inch) | Wall thickness (mm) | Mass (g) |
|---|---|---|---|
| Small elbow | ¾ | 5.3 | 167 |
| Medium elbow | 2 | 8.1 | 902 |
| Large elbow | 4 | 16.2 | 4,180 |

Then, the obtained pipe joint was preheated in the air atmosphere at a temperature of 275° C. or higher and 425° C. or lower and subsequently graphitized. The graphitization was performed by heat treatment in two stages, namely, the first graphitization in which a casting was held at 980° C. and the second graphitization in which the graphitization temperature was lowered from 760° C. to 720° C. Table 3 shows the work shape, the temperature and time in each of the first and second graphitizations, and the temperature lowering time required when shifting from the first graphitization end temperature to the second graphitization start temperature in each of Reference Examples 1 to 3. The heat treatment conditions were set such that the larger the work shape becomes, the longer the holding time of the first graphitization, the temperature lowering time required when shifting from the first graphitization to the second graphitization, and the temperature lowering time of the second graphitization respectively become.

TABLE 3

| | Work shape | Mixing ratio of air (vol %) | First graphitization Temperature (° C.) | Holding time (min) | Temperature lowering time (min) | Second graphitization Temperature range (° C.) | Temperature lowering time (min) |
|---|---|---|---|---|---|---|---|
| Reference Example 1 | Small elbow | 95.5 | 980 | 40 | 40 | 760 to 720 | 40 |
| Reference Example 2 | Large elbow | 95.6 | | 90 | 90 | | 90 |
| Reference Example 3 | Medium elbow | 95.4 | | 60 | 60 | | 60 |

The graphitization was performed using a heat treatment furnace in which the atmosphere was controlled. The heat treatment furnace was supplied with the converted gas generated by an exothermic converted gas generator. The converted gas was generated by mixing of air into a combustion gas composed of a mixture of 30% by volume of propane gas and 70% by volume of butane gas and then by combustion of the mixed gas. As shown in Table 3, the mixing ratio of the air in the mixed gas composed of the combustion gas and the air was set to be between 95.4% by volume and 95.6% by volume.

The generated converted gas was passed through a refrigeration dehydrator set at a temperature of 2° C. to remove part of water vapor, and then supplied to the heat treatment furnace. The total pressure of the converted gas supplied into the heat treatment furnace was the atmospheric pressure. The gas in the heat treatment furnace in each of the first graphitization and the second graphitization was sampled from an outlet of the heat treatment furnace. Then, the concentration of the sampled gas was measured using an infrared absorption CO concentration meter and a $CO_2$ concentration meter, and the dew point of the sampled gas was measured using a dew point meter. Table 4 shows the measured volume percentages of CO and $CO_2$ in the heat treatment furnace, the measured dew points of the sampled gas, and estimated values of the partial pressures of oxygen in the heat treatment furnace determined by the equilibrium calculations. The dew point corresponds to the amount of moisture contained in the gas. The remaining gas not mentioned in Table 4 was hydrogen and nitrogen.

TABLE 4

|  | First graphitization (980° C.) | | | | Second graphitization (760° C.) | | | |
| --- | --- | --- | --- | --- | --- | --- | --- | --- |
|  | CO (vol %) | $CO_2$ (vol %) | Partial pressure of oxygen in the heat treatment furnace (atm) | Dew point (° C.) | CO (vol %) | $CO_2$ (vol %) | Partial pressure of oxygen in the heat treatment furnace (atm) | Dew point (° C.) |
| Reference Example 1 | 12.2 | 5.2 | $9.1 \times 10^{-16}$ | 19.6 | 9.5 | 6.9 | $2.8 \times 10^{-20}$ | 18.0 |
| Reference Example 2 | 12.1 | 5.4 | $9.8 \times 10^{-16}$ | 18.3 | 11.0 | 6.0 | $1.6 \times 10^{-20}$ | 18.3 |
| Reference Example 3 | 12.5 | 5.2 | $8.3 \times 10^{-16}$ | 21.4 | 12.0 | 5.9 | $1.3 \times 10^{-20}$ | 18.8 |

In each of Reference Examples, the converted gas supplied to the heat treatment furnace during the first graphitization had the same component as that during the second graphitization. However, as shown in Table 4, the volume percentages of CO and $CO_2$ and the dew points of the sampled gas in the first graphitization were not the same as those in the second graphitization. This is because the converted gas supplied to the heat treatment furnace re-equilibrates at each graphitization temperature, resulting in the changed component ratio.

When comparing the estimated value of the partial pressure of oxygen in the furnace shown in Table 4 with the equilibrium oxygen concentration shown in Table 1, in each of Reference Examples, the partial pressure of oxygen in the furnace during the first graphitization was a value of the same order of 10 to the power of minus 16 as the equilibrium oxygen concentration in chemical formula 1 of $3.4 \times 10^{-16}$ atm, but was several thousands times as high as the equilibrium partial pressure of oxygen in chemical formula 2 of $2.6 \times 10^{-19}$ atm. From this fact, it is presumed that the atmosphere of the first graphitization was non-oxidizing and strongly decarburizing.

Then, with regard to the second graphitization, in each of examples, the partial pressure of oxygen in the furnace during the second graphitization was a value of the order of 10 to the power of minus 20 that did not exceed a value of 10 times as high as the equilibrium oxygen concentration in chemical formula 1 of $5.1 \times 10^{-21}$ atm, but higher than the equilibrium partial pressure of oxygen in chemical formula 2 of $2.8 \times 10^{-21}$ atm. From this fact, it is presumed that the atmosphere of the second graphitization was non-oxidizing and decarburizing.

Next, the pipe joint was immersed in the flux, pulled up, and dried. Then, the dried pipe joint was immersed in a bath with molten zinc heated to 460° C. to form a galvanized layer, which was then washed with water and cooled. The pipe joint obtained after the galvanizing had smooth and robust plating layers formed on both the outer and inner peripheral surfaces thereof, and peeling off of the plating layers was not observed.

As can be seen from Reference Examples mentioned above, the formation of the graphite and iron oxides on the surface of the black heart malleable cast iron member before the plating can be suppressed without adding a new production step.

<First Aspect>

A molten metal containing 3.1% by mass of carbon, 1.5% by mass of silicon, and 0.4% by mass of manganese, with the balance being iron and inevitable impurities, was prepared. Then, only 700 kg of the molten metal was poured into a ladle, to which 210 g (0.030% by mass) of bismuth was then added and stirred. The mixture was immediately poured into a mold to cast a plurality of pipe joints having an elbow shape and a nominal diameter of 2 inches. The cast pipe joint was taken out of the mold and lightly shot blasted for the purpose of removing casting sand adhering to the surface of the pipe joint after being taken out of the mold. The maximum wall thickness of the obtained pipe joint was approximately 8 mm, and the mass per pipe joint was about 900 g.

Then, the obtained pipe joint was preheated in the air atmosphere at a temperature of 275° C. or higher and 425° C. or lower and subsequently graphitized. The graphitization was performed by heat treatment in two stages, namely, the first graphitization in which a casting was held at 980° C. for 90 minutes and the second graphitization in which the graphitization temperature was lowered from 760° C. to 720° C. for 90 minutes. The temperature lowering time required when shifting from the first graphitization end temperature to the second graphitization start temperature was 90 minutes.

The graphitization was performed using a heat treatment furnace in which the atmosphere was controlled. The heat treatment furnace was supplied with the converted gas generated by an exothermic converted gas generator. The converted gas was generated by mixing of air into a combustion gas composed of a mixture of 30% by volume of propane gas and 70% by volume of butane gas and then by combustion of the mixed gas. The mixing ratio of the air in the mixed gas composed of the combustion gas and the air was set to be between 95.4% by volume and 95.6% by volume.

The generated converted gas was passed through a refrigeration dehydrator set at a temperature of 2° C. to remove part of water vapor, and then supplied to the heat treatment furnace. The total pressure of the converted gas supplied into the heat treatment furnace was the atmospheric pressure. The gas in the heat treatment furnace in each of the first graphitization and the second graphitization was sampled from an outlet of the heat treatment furnace. Then, the concentration of the sampled gas was measured using an infrared absorption CO concentration meter and a $CO_2$ concentration meter, and the dew point of the sampled gas was measured using a dew point meter. Table 5 shows the measured volume percentages of CO and $CO_2$ in the heat treatment furnace, the measured dew points of the sampled gas, and estimated values of the partial pressures of oxygen in the heat treatment furnace determined by the equilibrium calculations. The dew point corresponds to the amount of moisture contained in the gas. The remaining gas not mentioned in Table 5 was hydrogen and nitrogen.

TABLE 5

| | First graphitization (980° C.) | | | | Second graphitization (760° C.) | | | |
|---|---|---|---|---|---|---|---|---|
| | CO (vol %) | $CO_2$ (vol %) | Partial pressure of oxygen in the heat treatment furnace (atm) | Dew point (° C.) | CO (vol %) | $CO_2$ (vol %) | Partial pressure of oxygen in the heat treatment furnace (atm) | Dew point (° C.) |
| First Example | 12.1 | 5.4 | $9.8 \times 10^{-16}$ | 18.3 | 11.0 | 6.0 | $1.6 \times 10^{-20}$ | 18.3 |

When comparing the estimated value of the partial pressure of oxygen in the furnace shown in Table 5 with the equilibrium oxygen concentration shown in Table 1, the partial pressure of oxygen in the furnace during the first graphitization was a value of the same order of 10 to the power of minus 16 as the equilibrium oxygen concentration in chemical formula 1 of $3.4 \times 10^{-16}$ atm, but was several thousands times as high as the equilibrium partial pressure of oxygen in chemical formula 2 of $2.6 \times 10^{-19}$ atm. From this fact, it is presumed that the atmosphere of the first graphitization was non-oxidizing and strongly decarburizing.

Then, with regard to the second graphitization, the partial pressure of oxygen in the furnace during the second graphitization was a value of the order of 10 to the power of minus 20 that was equal to or lower than 10 times the equilibrium oxygen concentration in chemical formula 1 of $5.1 \times 10^{-21}$ atm and higher than the equilibrium partial pressure of oxygen in chemical formula 2 of $2.8 \times 10^{-21}$ atm. From this fact, it is presumed that the atmosphere of the second graphitization was non-oxidizing and decarburizing.

Figure 1:
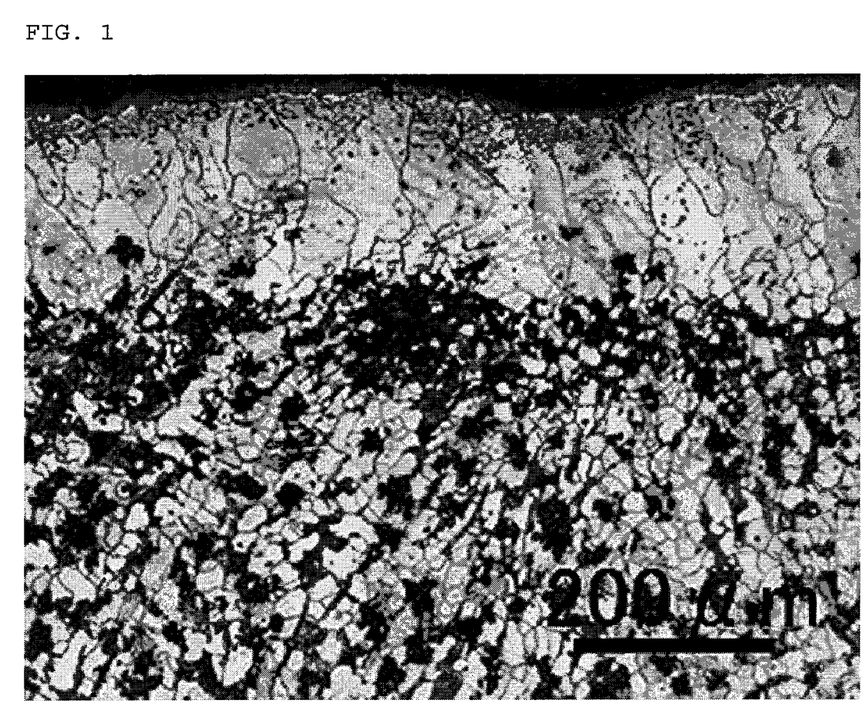
FIG. 1 is an optical micrograph showing the cross-sectional microstructure of a black heart malleable cast iron member after graphitization and before plating in a production method according to the present invention.
Figure 2:
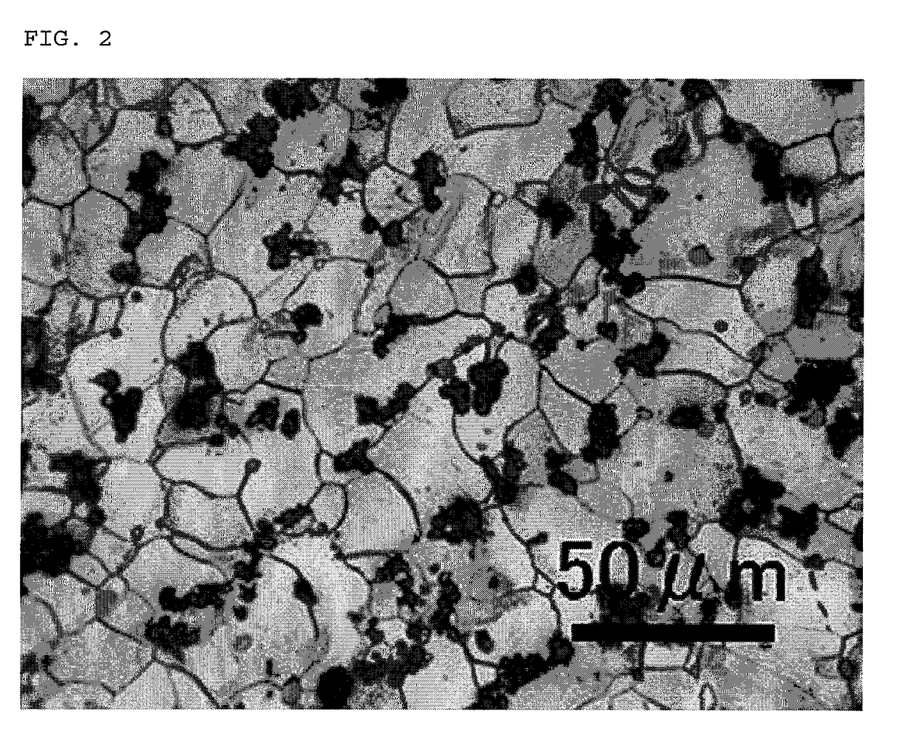
FIG. 2 is an enlarged optical micrograph showing the cross-sectional microstructure of an inside of the black heart malleable cast iron member shown in FIG. 1.
Figure 3:
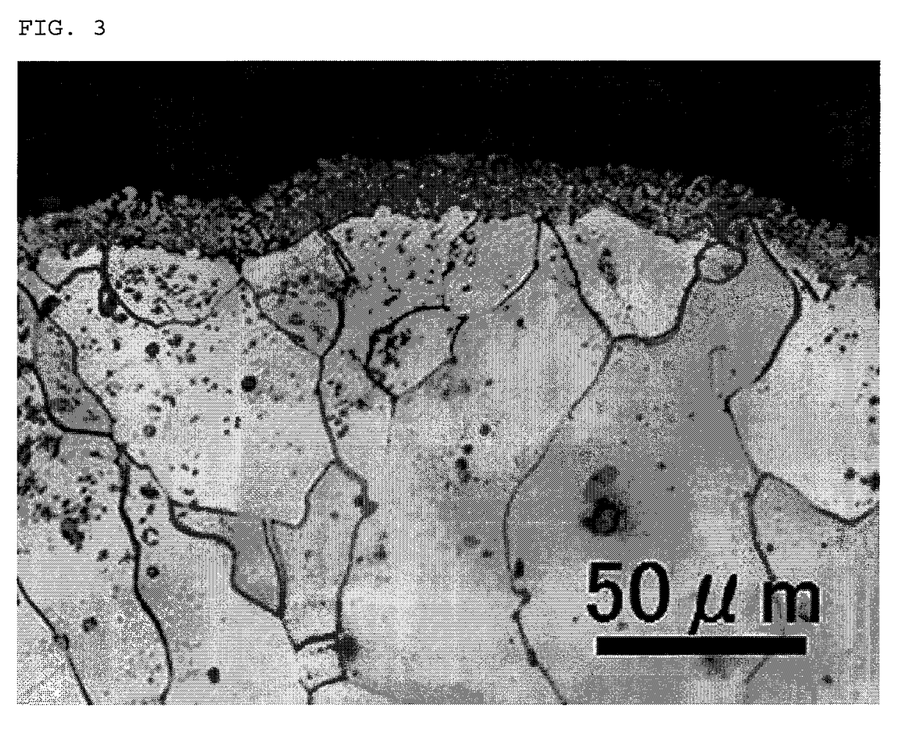
FIG. 3 is an enlarged optical micrograph showing the cross-sectional microstructure of a surface layer portion of the black heart malleable cast iron member shown in FIG. 1.

The color of the surface of the graphitized pipe joint was light gray. The cross-section of the pipe joint of this example was polished, and an optical micrograph of the cross-sectional microstructure thereof was taken. As shown in FIG. 1, a ferrite layer having a thickness of approximately 200 μm was formed in the vicinity of the surface of the pipe joint. A typical microstructure of the black heart malleable cast iron was formed in an inner portion of the pipe joint far away from its surface as shown in FIG. 2. Further, as shown in FIG. 3, in the vicinity of the surface of the pipe joint, a thin oxide layer having a thickness of approximately 20 μm was formed at the outermost surface of the ferrite layer.

Next, a flux raw material containing 46% by mass of zinc chloride and 54% by mass of ammonium chloride was dissolved in tap water to adjust its concentration so that the specific gravity of the flux solution was 1.25 at 50° C., followed by warming a flux bath containing the flux solution therein to 90° C., whereby the flux bath was prepared. Four of produced pipe joints were immersed in the flux inside the flux bath. One of these pipe joints was taken out after 3.0 minutes had elapsed from the immersion. Another pipe joint was taken out after 5.0 minutes had elapsed from the immersion. The remaining two pipe joints were taken out after 15 minutes had elapsed from the immersion. The pipe joint taken out of the flux was inserted into a furnace chamber of a muffle furnace heated to 300° C. in the air atmosphere and heated for 10 minutes. The temperature of the heated surface of the pipe joint at this time was estimated to be 150° C. or higher and 200° C. or lower.

Thereafter, the pipe joint was taken out of the muffle furnace and immediately immersed in a hot-dip galvanizing bath. The pipe joint was taken out after one minute had elapsed from the immersion, washed with water, dried, and cooled. In this way, the pipe joints of black heart malleable cast iron of Examples 1 to 4, each having a plating layer on its surface, were produced. The hot-dip galvanizing bath used in Example 1 contained a molten metal having 100% by mass of Zn as a component, and the hot-dip galvanizing baths used in Examples 2 to 4 contained a molten metal having 0.03% by mass of Al with the balance being Zn as components. The temperature of each hot-dip galvanizing bath was 500° C. or higher and 520° C. or lower. A pipe joint of Comparative Example 1 was simultaneously produced under the same conditions, other than the immersion time in the flux, as those of Examples 2 to 4 while setting the immersion time in the flux to 1.0 minute. The outer appearances of the plating layers on the pipe joints obtained in Examples and Comparative Example were evaluated visually, and the evaluation results thereof are shown in Table 6.

TABLE 6

| | Immersion time in flux | Components in hot-dip plating bath | Evaluation of plating layer | |
|---|---|---|---|---|
| | (minute) | | Bare spots | Gloss |
| Example 1 | 15 | 100% by mass of Zn | Not detected | Absence |
| Example 2 | 15 | 0.03% by mass of Al Balance being Zn | Not detected | Present |
| Example 3 | 5.0 | | A few | Present |
| Example 4 | 3.0 | | Several | Present |
| Comparative Example 1 | 1.0 | | Many | Present |

As shown in Table 6, in each of the pipe joints of Examples 1 and 2 where the immersion time in the flux was 15 minutes, the galvanized layer was uniformly formed on the surface of the pipe joint, and the state with no formation of the galvanized layer, called "bare spots", was not detected by virtually observing the outer appearance of the surface of the pipe joint. Regarding the gloss of the plating layer, no gloss was observed in the pipe joint of Example 1 subjected to the hot-dip plating in the galvanizing bath not containing aluminum, while the glossy plating layer was formed in the pipe joint of Example 2 subjected to hot-dip plating in the galvanizing bath containing 0.03% by mass of aluminum. In the pipe joint of Example 3 where the immersion time in the flux was 5.0 minutes, a few bare spots were observed at parts of the surface of the pipe joint. In the pipe joint of Example 4 where the immersion time in the flux was 3.0 minutes, several bare spots were observed. In contrast, in the pipe joint of Comparative Example 1 where the immersion time in the flux was 1.0 minute, many bare spots were observed.

From the results of Examples, it is found that the method for producing a plated black heart malleable cast iron member according to the present invention can form the plating layer that suppresses bare spots even when omitting pickling required for the conventional method after the graphitization, and can preferably form the good plating layer with no bare spots. It is also found that when the immersion time in the flux was preferably 5.0 minutes or more and preferably 15 minutes or more as the production condition of Examples, the occurrence of bare spots was hardly observed. This is considered to be because by immersing the pipe joint in the flux for a sufficient time, the oxide layer generated during the graphitization step could be removed to the extent that did not interfere with the formation of the plating layer by the hot-dip plating.

<Second Aspect>

Eight of the same pipe joints as those produced in the first aspect were immersed in the flux warmed to 90° C. using the same flux bath as used in the first aspect, and then taken out of the flux after 15 minutes have elapsed. The pipe joints taken out of the flux were inserted into a furnace chamber of a muffle furnace heated to 300° C. in an air atmosphere and heated for 10 minutes. The temperature of the heated surface of each pipe joint at this time was estimated to be 150° C. or higher and 200° C. or lower. Thereafter, the pipe joints were taken out of the muffle furnace, and then two of the pipe joints were immediately immersed in a hot-dip galvanizing bath. These pipe joints were taken out after one minute had elapsed from the immersion, washed with water, dried, and cooled, whereby two pipe joints were produced as the plated black heart malleable cast iron members of Example 5.

The remaining six pipe joints were taken out of the muffle furnace and cooled for 10 minutes, 15 minutes, or 60 minutes in the atmosphere. Then, they were immersed in the hot-dip galvanizing bath every two pipe joints. After one minute had elapsed from the immersion, the pipe joints were taken out and then washed with water, dried, and cooled, thereby producing every two pipe joints as the plated black heart malleable cast iron members. In Example 6, the pipe joints were produced by setting the cooling time to 10 minutes. In Example 7, the pipe joints were produced by setting the cooling time to 15 minutes. In Comparative Example 2, the pipe joints were produced by setting the cooling time to 60 minutes. The hot-dip galvanizing bath used in each of Examples contained a molten metal having 0.03% by mass of Al with the balance being Zn. The temperature of each hot-dip galvanizing bath was 500° C. The outer appearances of the plating layers obtained in Examples and Comparative Example were evaluated visually, and the evaluation results thereof are shown along with the estimated values of the surface temperatures immediately before the hot-dip galvanizing, in Table 7.

TABLE 7

| | Cooling time after heat treatment | Estimated value of surface temperature immediately before hot-dip plating | Evaluation of bare spots on the plating layer (n = 2) | |
|---|---|---|---|---|
| | | | Specimen a | Specimen b |
| Example 5 | Almost none | 160° C. | Not detected | Not detected |
| Example 6 | 10 minutes | 110° C. | Not detected | Present |
| Example 7 | 15 minutes | 90° C. | Present (slight) | Present (minimum) |
| Comparative Example 2 | 60 minutes | 30° C. | Present | Present |

As shown in Table 7, in terms of the conditions of Examples, no bare spots were observed at all when an estimated value of the surface temperature of the black heart malleable cast iron member after being taken out of the flux and before being subjected to the hot-dip plating was 160° C. For 110° C., bare spots were also hardly observed. In contrast, in Comparative Example 2 where the black heart malleable cast iron member after the heat treatment was cooled for over 15 minutes so that its surface temperature becomes lower than 90° C., many bare spots tended to be generated. This is considered to be because by keeping the surface temperature of the black heart malleable cast iron member at a predetermined temperature or higher immediately before being introduced into the hot-dip galvanizing bath, the cooling of molten zinc is prevented during the hot-dip galvanizing, thus enabling the formation of the normal galvanized layer with no bare spots caused. The detailed reason for this is not clear, but it is also considered that by suppressing a decrease in the temperature of the molten zinc due to the cooling, the above-mentioned black product tends to be more smoothly detached from the surface of the black heart malleable cast iron member.

Figure 4:
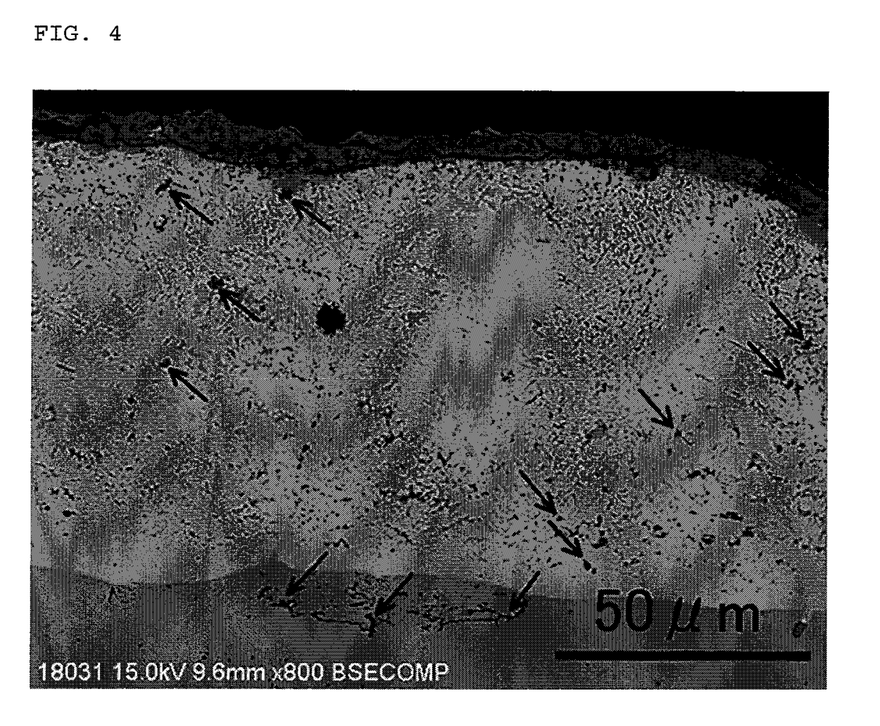
FIG. 4 is a backscattered electron composition image showing an example of the cross-sectional microstructure of a plated black heart malleable cast iron member produced by the production method according to the present invention.

FIG. 4 is a backscattered electron composition image showing an example of the cross-sectional microstructure of a plated black heart malleable cast iron member produced by the production method according to the present invention. The lower part of the image represents the black heart malleable cast iron member, while a bright layer at the center part of the image represents a hot-dip galvanized layer. As shown in FIG. 4, a layered phase was formed at a part of a cast iron surface in the plated black heart malleable cast iron member. Fine phases were also formed in parts of the inside of the hot-dip galvanized layer. In FIG. 4, parts of these phases are represented by the arrows. When the spectra of these phases were confirmed by energy dispersive X-ray spectroscopy analysis, it was found that each of these phases contained a large amount of silicon and oxygen, and thus was composed of a silicon oxide. In addition, a work-affected layer that would otherwise be observed after shot peening was not recognized on the cast iron surface of the black heart malleable cast iron member.

Figure 5:
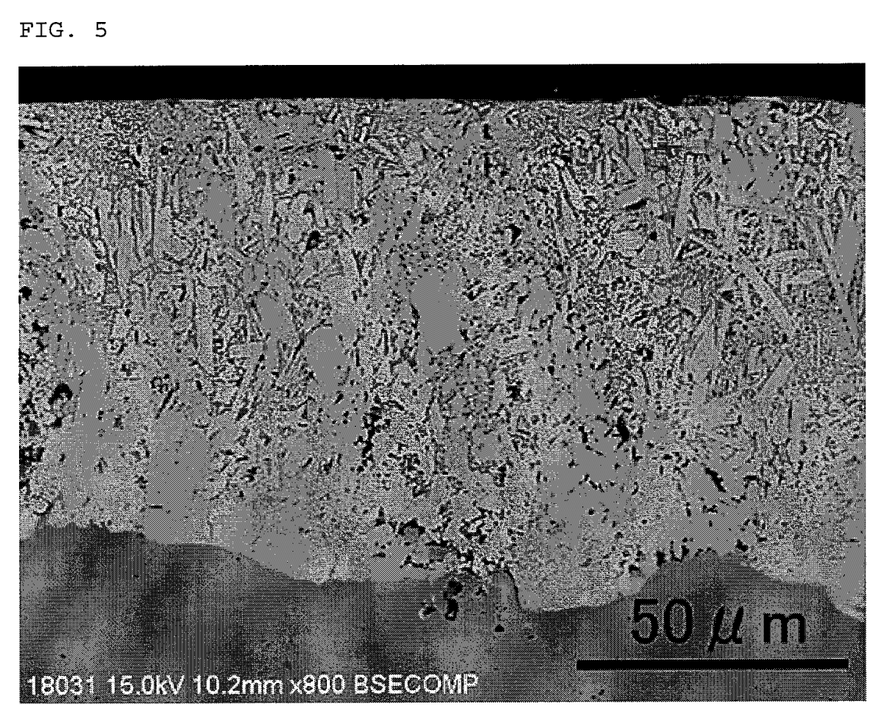
FIG. 5 is a backscattered electron composition image showing an example of the cross-sectional microstructure of a plated black heart malleable cast iron member produced by a production method according to the prior art.

FIG. 5 is a backscattered electron composition image showing an example of the cross-sectional microstructure of a plated black heart malleable cast iron member produced by a production method according to the prior art. The plated black heart malleable cast iron member was produced by performing the graphitization in the air atmosphere without preheating and then removing an oxide layer on its surface by pickling, followed by flux treatment and hot-dip galvanizing. As shown in FIG. 5, the formation of a layered phase was not observed on the surface of the plated black heart malleable cast iron member. Although some fine phases were formed only in portions of the inside of the hot-dip galvanized layer, as a result of analysis by energy dispersive X-ray spectroscopy, it was found that the precipitation of a phase containing a large amount of silicon and oxygen was less likely to occur. It is considered that the black granular parts shown in FIG. 5 are not silicon oxides, but voids or the like generated between zinc crystals. Furthermore, crystal grains of the plating layers shown in both FIGS. 4 and 5 are observed to have different shapes from each other because of somewhat different producing conditions in FIGS. 4 and 5, but this fact does not affect the evaluation of the plating layers.

From the examples of observation mentioned above, it is found that in the production method according to the present invention, a part of the surface of the plated black heart malleable cast iron member or a part of the inside of the hot-dip galvanized layer may have a characteristic microstructure in which a relatively large amount of phases made of silicon oxides are present while being dispersed. The reason why such a characteristic precipitate is observed is not clear, but it is presumed that instead of a robust iron oxide phase formed on the surface of the black heart malleable cast iron, a layered phase made of silicon oxides is formed on a part of the surface thereof in a process of performing the graphitization in a controlled atmosphere. Furthermore, it is also presumed that parts of phases made of silicon oxides are taken in the galvanized layer in the process of forming the galvanized layer by the hot-dip galvanizing and dispersed finely.

The disclosure of the present invention may include the following aspects.
(Aspect a1)
A method for producing a black heart malleable cast iron member, the method including performing graphitization in a non-oxidizing atmosphere, wherein
the graphitization is performed in a decarburizing atmosphere.
(Aspect a2)
The method for producing a black heart malleable cast iron member according to the aspect a1, wherein the decarburizing atmosphere contains a converted gas generated by combustion of a mixed gas of combustion gas and air.
(Aspect a3)
The method for producing a black heart malleable cast iron member according to the aspect a1 or a2, wherein a plating layer is formed on a surface of the graphitized black heart malleable cast iron member.
(Aspect a4)
The method for producing a black heart malleable cast iron member according to the aspect a3, further including performing flux treatment on the black heart malleable cast iron member after the graphitization and before the formation of the plating layer.
(Aspect a5)
The method for producing a black heart malleable cast iron member according to the aspect a3 or a4, wherein the plating layer includes a hot-dip galvanized layer.
(Aspect a6)
A pipe joint produced by the method for producing a black heart malleable cast iron member according to any one of aspects a1 to a5.
(Aspect b1)
A method for producing a black heart malleable cast iron member having a plating layer on a surface thereof, the method including the steps of:
performing graphitization in a non-oxidizing and decarburizing atmosphere;
immersing a black heart malleable cast iron member obtained after the graphitization, in a flux; and
performing hot-dip plating on the black heart malleable cast iron member taken out of the flux.
(Aspect b2)
The method for producing a black heart malleable cast iron member according to the aspect b1, further including heating the black heart malleable cast iron member to a temperature of 100° C. or higher and 250° C. or lower after taking the black heart malleable cast iron member out of the flux and before performing the hot-dip plating thereon.
(Aspect b3)
The method for producing a black heart malleable cast iron member according to the aspect b1 or b2, wherein the flux is an aqueous solution containing zinc chloride and ammonium chloride.
(Aspect b4)
The method for producing a black heart malleable cast iron member according to any one of the aspects b1 to b3, wherein the step of performing the hot-dip plating includes performing hot-dip galvanizing.
(Aspect b5)
The method for producing a black heart malleable cast iron member according to any one of the aspects b1 to b4, wherein the black heart malleable cast iron member is a pipe joint.

The present application claims priority to Japanese Patent Application No. 2017-184901 and Japanese Patent Application No. 2018-055993, the disclosures of which are incorporated herein by reference in its entirety.

The invention claimed is:

1. A method for producing a plated black heart malleable cast iron member having a plating layer on a surface of a black heart malleable cast iron member, the method comprising:
performing graphitization in a non-oxidizing and decarburizing atmosphere to form a ferrite layer on the surface of the black heart malleable cast iron member such that an oxide layer formed on the ferrite layer during graphitization has a thickness of 20 μm or less;
immediately thereafter, immersing the black heart malleable cast iron member obtained after the graphitization, in a flux for 3.0 minutes or more so as to remove the oxide layer;
heating the black heart malleable cast iron member taken out of the flux, to 90° C. or higher; and
performing hot-dip plating on the heated black heart malleable cast iron member.

2. The method for producing a plated black heart malleable cast iron member according claim 1, wherein the non-oxidizing and decarburizing atmosphere is an atmosphere in which a partial pressure of oxygen is 10 times or less as high as an equilibrium partial pressure of oxygen in chemical formula 1 below and higher than an equilibrium partial pressure of oxygen in chemical formula 2 below,

[Chemical Formula 1]

[Chemical Formula 2]

3. The method for producing a plated black heart malleable cast iron member according to claim 2, wherein the non-oxidizing and decarburizing atmosphere contains a converted gas generated by combustion of a mixed gas of combustion gas and air.

4. The method for producing a plated black heart malleable cast iron member according to claim 2, wherein the black heart malleable cast iron member is heated to 100° C. or higher and 250° C. or lower in the step of heating the black heart malleable cast iron member after being taken out of the flux.

5. The method for producing a plated black heart malleable cast iron member according to claim 2, wherein the flux is an aqueous solution containing a weakly acidic chloride.

6. The method for producing a plated black heart malleable cast iron member according to claim 2, wherein the step of performing the hot-dip plating includes performing hot-dip galvanizing.

7. The method for producing a plated black heart malleable cast iron member according to claim 1, further comprising the step of preheating the black heart malleable cast iron member at a temperature of 275° C. or higher and 425° C. or lower before the step of performing the graphitization.

8. The method for producing a plated black heart malleable cast iron member according to claim 1, wherein the step of performing the graphitization includes first graphitization that includes heating the black heart malleable cast iron member at a temperature exceeding 900° C. and second graphitization that is performed on the black heart malleable cast iron member at a start temperature of 720° C. or higher and 800° C. or lower and at a completion temperature of 680° C. or higher and 780° C. or lower.

9. The method for producing a plated black heart malleable cast iron member according to claim 8, wherein at least the first graphitization in the step of performing the graphitization is performed in the non-oxidizing and decarburizing atmosphere.

10. The method for producing a plated black heart malleable cast iron member according to claim 1, wherein the non-oxidizing and decarburizing atmosphere contains a converted gas generated by combustion of a mixed gas of combustion gas and air.

11. The method for producing a plated black heart malleable cast iron member according to claim 1, wherein the black heart malleable cast iron member is heated to 100° C. or higher and 250° C. or lower in the step of heating the black heart malleable cast iron member after being taken out of the flux.

12. The method for producing a plated black heart malleable cast iron member according to claim 1, wherein the flux is an aqueous solution containing a weakly acidic chloride.

13. The method for producing a plated black heart malleable cast iron member according claim 1, wherein the flux is an aqueous solution containing zinc chloride and ammonium chloride.

14. The method for producing a plated black heart malleable cast iron member according to claim 1, wherein the step of performing the hot-dip plating includes performing hot-dip galvanizing.

15. The method for producing a plated black heart malleable cast iron member according to claim 1, wherein the black heart malleable cast iron member is a pipe joint.

16. The method for producing a plated black heart malleable cast iron member according to claim 1, wherein the method excludes shot blasting.

* * * * *